(12) United States Patent
Li

(10) Patent No.: US 11,382,729 B1
(45) Date of Patent: Jul. 12, 2022

(54) TOOTHBRUSH HEAD

(71) Applicant: Shenzhen Nuosheng Shiyuan Technology Co., Ltd., Guangdong (CN)

(72) Inventor: Hanping Li, Guangdong (CN)

(73) Assignee: SHENZHEN NUOSHENG SHIYUAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/530,506

(22) Filed: Nov. 19, 2021

(30) Foreign Application Priority Data

Oct. 25, 2021 (CN) .......................... 202122561221.4

(51) Int. Cl.
| | | |
|---|---|---|
| *A61C 17/22* | (2006.01) | |
| *A46B 9/04* | (2006.01) | |
| *A46B 3/08* | (2006.01) | |
| *A46B 5/00* | (2006.01) | |
| *A46B 13/02* | (2006.01) | |

(52) U.S. Cl.
CPC .............. *A61C 17/222* (2013.01); *A46B 3/08* (2013.01); *A46B 5/0095* (2013.01); *A46B 9/04* (2013.01); *A46B 13/02* (2013.01)

(58) Field of Classification Search
CPC ....... A61C 17/222; A46B 3/08; A46B 5/0095; A46B 9/04; A46B 13/02
See application file for complete search history.

(56) References Cited

U.S. PATENT DOCUMENTS

| | | | |
|---|---|---|---|
| 10,912,377 B1* | 2/2021 | Kuang | ............... A61C 17/3481 |
| 11,071,612 B1* | 7/2021 | Zhou | ......................... A46B 9/04 |
| 11,096,768 B1 | 8/2021 | Lin | |
| 2010/0043156 A1* | 2/2010 | Kressner | ............... A61C 17/222 |
| | | | 15/22.1 |
| 2014/0143964 A1* | 5/2014 | Fattori | ............... A61C 17/3481 |
| | | | 15/22.1 |
| 2015/0020325 A1* | 1/2015 | Yoshida | ............... A46B 5/0095 |
| | | | 15/22.1 |
| 2015/0082560 A1* | 3/2015 | Graeve | ............... A61C 17/222 |
| | | | 15/22.1 |
| 2015/0245895 A1* | 9/2015 | Kressner | ............... A61C 17/225 |
| | | | 15/22.1 |
| 2019/0174909 A1* | 6/2019 | Huang | ...................... F16D 1/05 |
| 2020/0085178 A1* | 3/2020 | Van Den Ende | ...... A61C 1/142 |

(Continued)

FOREIGN PATENT DOCUMENTS

CN 113017892 A 6/2021

*Primary Examiner* — Weilun Lo

(57) ABSTRACT

A toothbrush head for an electric toothbrush including a driving shaft, includes a brush rod and a connecting member. The brush rod has a first end configured to carry bristles and a second end configured to be connected with the driving shaft, the second end defines a holding groove, and a lower surface of the second end is provided with an opening communicated with the holding groove. The connecting member includes a connecting body and an elastic piece connected to the connecting body. The connecting body is arranged inside the holding groove, the elastic piece is arranged between the opening and the connecting body and resists against an inner sidewall surrounding the holding groove. The opening and the holding groove are configured to allow the driving shaft to be inserted therethrough to be engaged with the connecting body.

15 Claims, 6 Drawing Sheets

(56) References Cited

U.S. PATENT DOCUMENTS

| | | | | |
|---|---|---|---|---|
| 2021/0100346 A1* | 4/2021 | Dishon | ................ | A46B 5/0095 |
| 2021/0322141 A1* | 10/2021 | He | ................ | A61C 17/222 |
| 2022/0000253 A1* | 1/2022 | Huang | ................ | A46B 13/023 |
| 2022/0039932 A1* | 2/2022 | Kuang | ................ | A61C 17/222 |

* cited by examiner

100

TOOTHBRUSH HEAD

CROSS-REFERENCE TO RELATED APPLICATIONS

The application claims priority of Chinese patent application CN202122561221.4, filed on Oct. 25, 2021, which is incorporated herein by reference in its entirety.

FIELD

The subject matter herein generally relates to toothbrushes, and particularly relates to a toothbrush head.

BACKGROUND

With improvement of living standards, more and more people begin to use electric toothbrushes. Electric toothbrushes use a motor vibrating in a high-speed to drive a toothbrush head to rotate or vibrate to achieve an effect of tooth cleaning. At present, in order to prolong a service life of the electric toothbrush and meet requirements of different people, the toothbrush head and the body of the electric toothbrush are detachable connected together through an elastic piece in the toothbrush head being engaged with a driving shaft of the body.

In available electric toothbrushes, the elastic piece in the brush is fixed in the toothbrush head by a holder, which is complex in structure and cost for manufacture and assembly relatively highly.

SUMMARY

There is a desire to provide a toothbrush head, which is simple in structure, easy to assemble, and reduce manufacture cost.

The present disclosure provides a toothbrush head for an electric toothbrush. The electric toothbrush includes a toothbrush body and a driving shaft arranged on the toothbrush body. The toothbrush head includes a brush rod and a connecting member. The brush rod has a first end configured to carry bristles and a second end configured to be connected with the driving shaft. The second end defines a holding groove, and a lower surface of the second end away from the first end is provided with an opening communicated with the holding groove. The connecting member includes a connecting body and an elastic piece connected to the connecting body. The connecting body is arranged inside the holding groove, the elastic piece is arranged between the opening and the connecting body and resists against an inner sidewall surrounding the holding groove to prevent the elastic piece from moving out of the holding groove. The opening and the holding groove are configured to allow the driving shaft to be inserted therethrough to be engaged with the connecting body.

In at least one embodiment, the connecting member is detachably arranged inside the holding groove.

In at least one embodiment, the elastic piece extends in a circular arc shape to define a limit hole, the limit hole is configured to allow the driving shaft to pass therethrough to be engaged with the connecting body.

In at least one embodiment, the holding groove includes an upper groove and a lower groove communicated with the upper groove and the opening, the connecting body is arranged inside the upper groove and the elastic piece is arranged inside the lower groove and resists against an inner sidewall surrounding the lower groove, a diameter of the limit hole is D1, a diameter of the upper groove is D2, a diameter of the lower groove is D3, D3>D1>D2.

In at least one embodiment, a direction from the second end to the first end is an installation direction, projections of the upper groove, the limit hole, and the lower groove on a plane perpendicular to the installation direction form centric circles.

In at least one embodiment, the elastic piece is provided with an adjusting gap running through at least part of a sidewall thereof, and the adjusting gap is configured to adjust a force of the elastic piece against the inner sidewall surrounding the lower groove.

In at least one embodiment, the adjusting gap together with the connecting body divides the elastic piece into a first elastic section and a second elastic section, lengths of the first elastic section and the second elastic section are the same.

In at least one embodiment, the connecting member further includes a connecting part extends from a part of the elastic piece in the installation direction, and a stop part connected between the connecting part and the connecting body, an angle between the connecting body and the stop part and an angle between the stop part and the connecting part are obtuse.

In at least one embodiment, the stop part is recessed in the installation direction to form an arc shape.

In at least one embodiment, the connecting body, the stop part, and the connecting part have same widths.

In at least one embodiment, an angle between the stop part and the connecting part, and an angle between the stop part and the connecting body is 100° ~140°.

In at least one embodiment, the connecting body comprises a clamping plate extends in a first direction parallel to an axis of the holding groove and a clamping protrusion protrudes in a second direction perpendicular to the first direction from the clamping plate.

In at least one embodiment, the connecting member is integrally formed from metal materials.

In at least one embodiment, the toothbrush rod further includes a protruding structure protrudes from an inner sidewall surrounding the holding groove, the protruding structure resists against a lower surface of the elastic piece to prevent the elastic piece from moving out of the holding groove.

In at least one embodiment, the toothbrush head further includes a toothbrush head cap, wherein the toothbrush rod defines a plurality of spaced brush holes configured to fix bristles, the toothbrush head cap is configured to cover the first end of the toothbrush head to help the brush holes to fix the bristles.

An electric toothbrush includes a toothbrush body, a driving shaft arranged on the toothbrush body and the toothbrush head detachably connected to the driving shaft.

The toothbrush head provided by the present disclosure includes the toothbrush rod. The toothbrush rod includes the first end configured to fix bristles and the second end configured to be connected with the driving shaft. The second end defines the holding groove and the lower surface of the second end is provided with the opening communicated with the holding groove. The connecting body is arranged inside the holding groove. The elastic piece resists against the inner sidewall surrounding the holding groove. When the driving shaft is inserted into the holding groove through the opening, the connecting body is engaged with the driving shaft to connect the toothbrush head and the driving shaft together. When assembling the connecting member, the connecting member can be inserted into the holding groove through the opening, and the elastic piece resists against the inner sidewall surrounding the holding groove, so as to fix the connecting body inside the holding groove. Therefore, the connecting member can be fixed inside the holding groove without extra fixing structures, which simplify a structure of the toothbrush head, simplify assemble operations and reduce manufacture cost.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Figure 1:
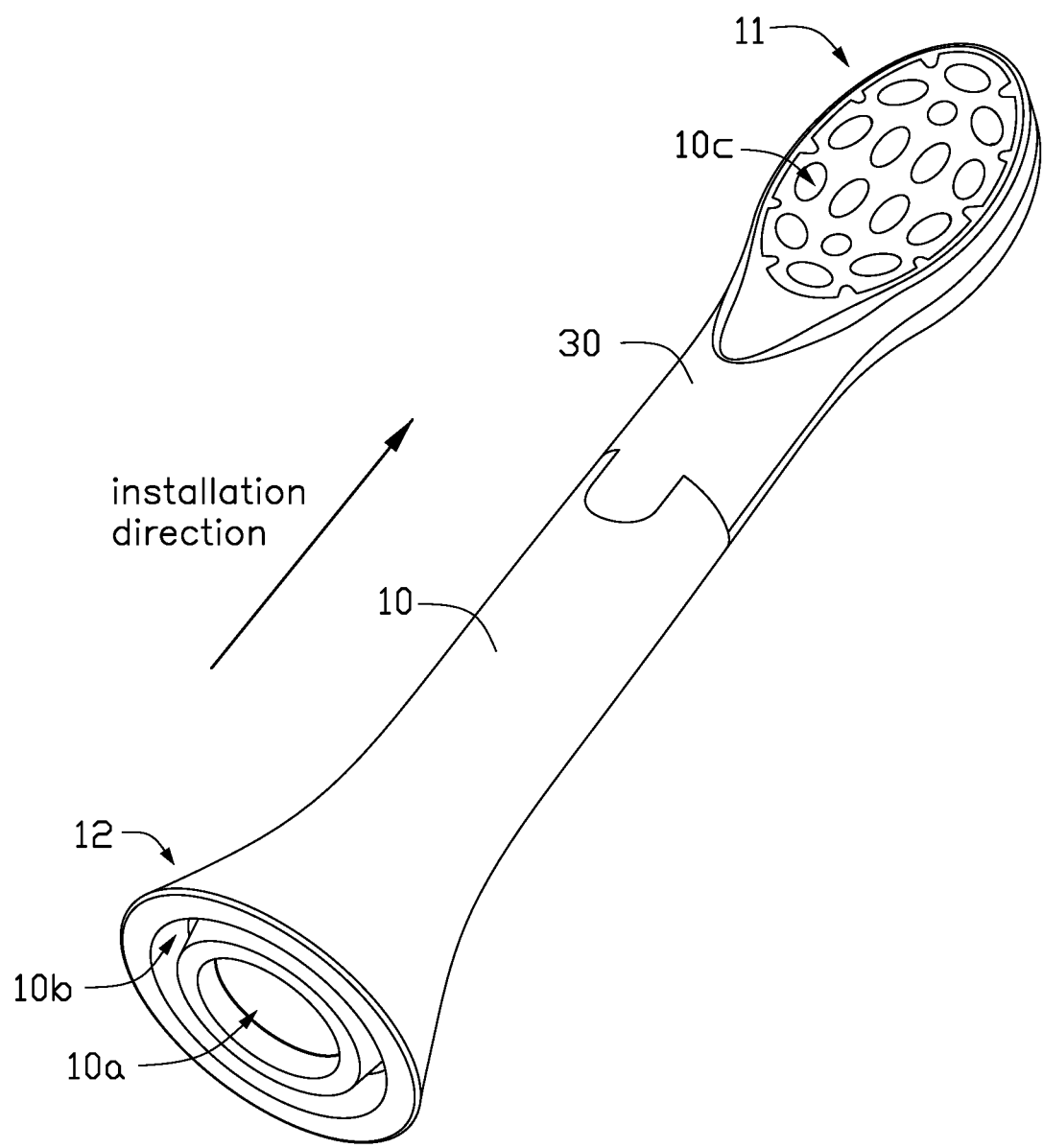
FIG. 1 is a schematic view of a toothbrush head according to an embodiment of the present disclosure, the bush head including a connecting member.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Referring to FIGS. 1-5, a toothbrush head 100 provided by an embodiment of the present disclosure is used for an electric toothbrush. The electric toothbrush includes a toothbrush body, a driving shaft, and a toothbrush head detachably connected with the toothbrush body. The toothbrush body includes a housing, a driving motor and a power supply. The housing has a hollow cavity including a mounting cavity and a limit hole communicating with the mounting cavity. The driving motor is arranged in the mounting cavity and is electrically connected to the power supply through wires. The power supply provides power to the driving motor. It should be understood, the power supply may be a built-in power unit, such as a dry cell or a lithium battery, or an external power unit, such as the mains supply or a portable power supply. One end of the driving shaft extends into the mounting cavity through the limit hole to be connected with an output shaft of the driving motor, and the other end of the driving shaft extends out of the housing to be connected with the toothbrush head 100. The driving motor drives the driving shaft to move (for example, rotate or vibrate), and the driving shaft brings the toothbrush head 100 to move. The driving motor may be a vibration motor or a linear motor. That is, the driving motor can drive the toothbrush head 100 to move. Types or structures of the driving motor is not limited in the present disclosure.

In order to facilitate disassembly and assembly of the toothbrush head 100 and to simplify assembly operation in production and manufacturing, the toothbrush head 100 provided by the present disclosure includes a brush rod 10. The brush rod 10 can be formed by machining from metal materials, which enhance strength of the brush rod 10 and prolong a service life of the brush rod 10. In at least one embodiment, the brush rod 10 can be formed by plastic material through an injection molding process, which makes the toothbrush head 100 more convenient for large-scale mass production. The brush rod 10 extends in a long strip shape and is substantially in a cylindrical shape. The brush rod 10 includes a first end 11 and a second end 12. A first direction from the second end 12 to the first end 11 is defined as an installation direction, along which the driving shaft is inserted into the brush rod 10. The installation direction is from a center of the second end 12 to a center of the first end 11. Specifically, the first end 11 defines a plurality of spaced brush holes 10c configured to fix bristles, and the second end 12 defines a holding groove 10a. An axis of the holding groove is parallel to the installation direction. An opening communicated with the holding groove 10a is arranged at a lower surface of the brush rod 10. When the driving shaft is inserted into the holding groove 10a, the lower surface of the brush rod 10 resists against the housing. When the toothbrush head 100 is in use, the driving shaft of the electric toothbrush is inserted into the holding groove 10a so as to connect the housing of the electric toothbrush with the second end of the brush rod 10. At least part of an outer surface of the brush rod 10 is a continuous surface without a hole communicated with the holding groove 10a, which simplifies a structure of the toothbrush head 100.

The toothbrush head 100 further includes a connecting member 20. The connecting member 20 includes a connecting body 21 and an elastic piece 22 connected with the connecting body 21. The connecting body 21 is arranged inside the holding groove 10a. The elastic piece 22 resists against an inner sidewall surrounding the holding groove 10a. When the driving shaft is inserted into the holding groove 10a, the connecting body is engaged with the driving shaft to connect the toothbrush head 100 and the driving shaft together. When assembling the connecting member 20, the connecting member 20 can be inserted into the holding groove 10a through the opening defined on the lower surface of the brush rod 10. The elastic piece 22 resists against the inner sidewall surrounding the holding groove 10a, so as to fix the connecting body 21 inside the holding groove 10a. Therefore, the connecting member 22 can be fixed inside the holding groove 10a without extra fixing structures, which simplify a structure of the toothbrush head 100, simplify assemble operations and reduce manufacture cost. In addition, since no need of the extra fixing structures to fix the connecting member 20, the structure of the toothbrush head 100 is more compact, which can minimize relative vibration between the connecting member 20 and the brush rod 10. Therefore, the driving shaft drives the connecting member 20 to bring the brush rod 10 to vibrate, which is more stable and reduces energy consumption. Furthermore, during using, the bristles can be closer to the tooth surface and improve oral cleaning effect of the electric toothbrush.

Figure 3:
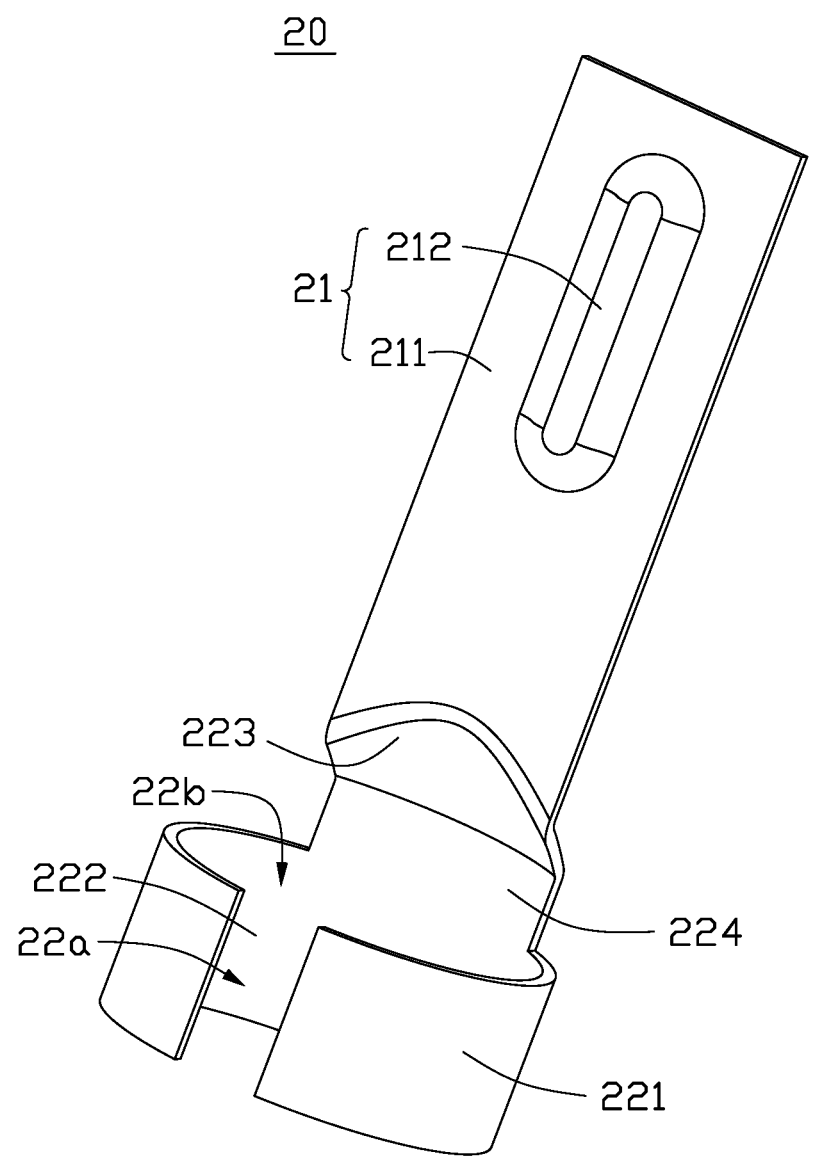
FIG. 3 is a schematic view of the connecting member.

Referring to FIG. 3, in at least one embodiment, the elastic piece 22 and the connecting body 21 are integrally formed. The holding groove 10a includes an upper groove 11a and a lower groove 12a communicated with the upper groove 11a along the installation direction. The elastic piece 22 extends along a circular shape on a plane perpendicular to the installation direction. The elastic piece 22 defines a limit hole 22b. The lower groove 12a is adjacent to the lower surface and a cross-section of the lower groove 12a is in a circular shape. A diameter of the lower groove 12a is slightly less than an outer diameter of the elastic piece 22. The upper groove 11a is arranged at a side of the lower groove 12a away from the lower surface. A shape of the upper groove 11a is corresponding to that of the driving shaft. When the connecting member 20 is inserted into the holding groove 10a through the opening, the connecting body 21 is arranged in the upper groove 11a and extends along the installation direction. A surface of the connecting body 21 facing an inner sidewall surrounding the upper groove 11a is arc-shaped, which is corresponding to an outer surface of the driving shaft. The elastic piece 22 is arranged inside the lower groove 12a. An axis of the limit hole 22b is parallel to that of the lower groove 12a. Since the outer diameter of the elastic piece 22 is greater than the inner diameter of the lower groove 12a, when the connecting member 20 is inserted into the holding groove 10a, the elastic piece 22 is compressed and the elastic piece 22 resists against the inner sidewall surrounding the lower groove 12a. When the driving shaft is inserted into the brush rod 10, it passes through the opening, the lower groove 12a, and the limit hole 22b in turn, and then into the upper groove to be engaged with the connecting body 21. In the present disclosure, the elastic piece 22 elastically resists against the inner sidewall surrounding the lower groove 12a so as to fix the connecting body 21 in the upper groove 11a, which makes the connecting member 20 simple in structure, and the connection with the brush rod 10 is more stable. Moreover, the elastic piece 22 extends in a circular arc in the lower groove 12a, which is not only convenient for processing and forming, but also can increase contact area with the inner sidewall surrounding the lower groove 12a, therefore, a connection between the connecting member 20 and the brush rod 10 is more stable.

It should be understood, in at least one embodiment, the elastic piece 22 can extend in any suitable shape, such as a rectangular shape, a triangle shape, an ellipse shape, or other geometrical shape. The shape in which the elastic piece 22 extends is not limited in the present disclosure.

In order to ensure the overall balance, a cross section of the driving shaft is smaller than that of the housing, that is, an overall shape of the toothbrush body and the driving shaft is conical. In at least one embodiment, a projection of the upper groove 11a on a plane perpendicular to the installation direction is in a center of the lower groove 12a. Cross sections of the upper groove 11a and the lower groove 12a are circular. When the connecting member 20 is inserted into the holding groove 10a, axes of the limit hole 22b, the upper groove 11a and the lower groove 12a are coincident. That is, projections of the upper groove 11a, the lower groove 12a and the limit hole 22b on the plane perpendicular to the installation direction form concentric circles. An inner diameter of the limit hole 22b is D1, an inner diameter of the upper groove 11a is D2, an inner diameter of the lower groove 12a is D3, D3>D1>D2, which can well fit an overall structure of the toothbrush body and the driving shaft. The wall thickness of the brush rod 10 is more uniform, which not only ensures the overall strength of the brush rod 10, but also saves molding materials and production costs.

In order to facilitate adjustment of an interaction force between the elastic piece 22 and the inner sidewall surrounding the lower groove 12a, the elastic piece 22 defines an adjusting gap 22a running through a sidewall thereof. The adjusting gap 22a can be formed on a circular elastic piece by machining, or a gap between two opposite ends of a strip-shaped elastic piece extending towards each other to form a circular arc. The adjusting gap 22a together with the connecting body 21 divides the elastic piece 22 into a first elastic section 221 and a second elastic section 222. That is, the connecting body 21 is connected at the elastic piece where one end of the first elastic section 221 and one end of the second elastic section 222 are connected. The other end of the first elastic section 221 and the other end of the second elastic section 222 are spaced by the adjusting gap 22a. The adjusting gap 22a is configured to adjust forces of the first elastic section 221 and the second elastic section 222 against the inner sidewall surrounding the lower groove 12a. The first elastic section 221 can be controlled to move towards/away from the second elastic section 222 by adjusting a size of the adjusting gap 22a. When a size of the holding groove 10a is fixed, the force of the first elastic section 221 and the second elastic section 222 against the inner sidewall surrounding the lower groove 12a can be increased or reduced by adjusting the size of the adjusting gap 22a, so as to make the connection between the connecting member 20 and the brush rod 10 more stable, or the assembling the connecting member 20 with the brush rod 10 more labor-saving.

In order to ensure that the contact area between the elastic piece 22 and the inner sidewall surrounding the lower groove 12a is greater enough, the size of the adjusting gap 22a should be as small as possible, as long as the adjusting gap 22a can separate the first elastic section 221 and the second elastic section 222. In at least one embodiment, the adjusting gap 22a facing the connecting body 21, that is, the first elastic section 221 and the second elastic section are symmetric relative to the connecting body 21. A length of the first elastic section 221 and a length of the second elastic section 222 are equal, so that the forces applied on two opposite sides of the connecting body 21 are better balanced.

Figure 4:
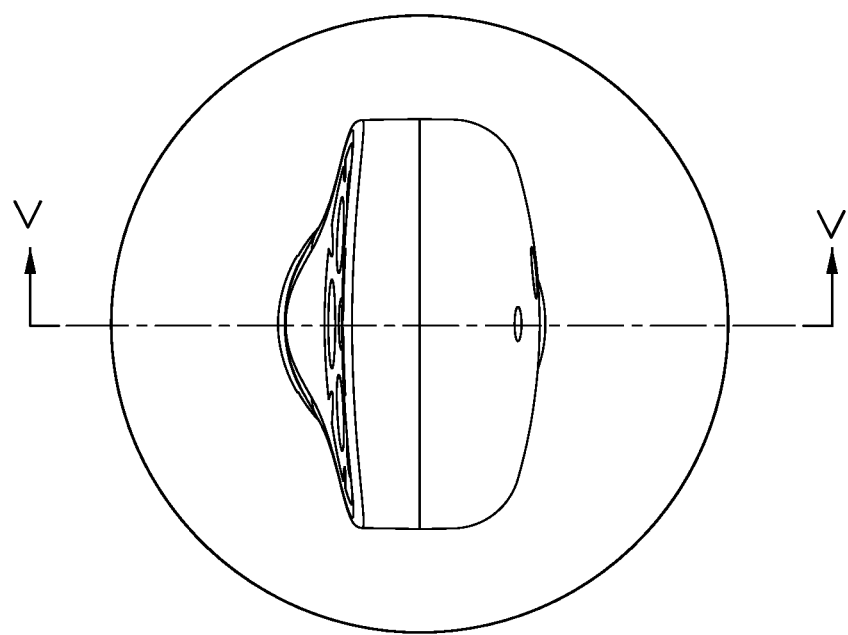
FIG. 4 is a top plane view of the toothbrush head of FIG. 1.
Figure 5:
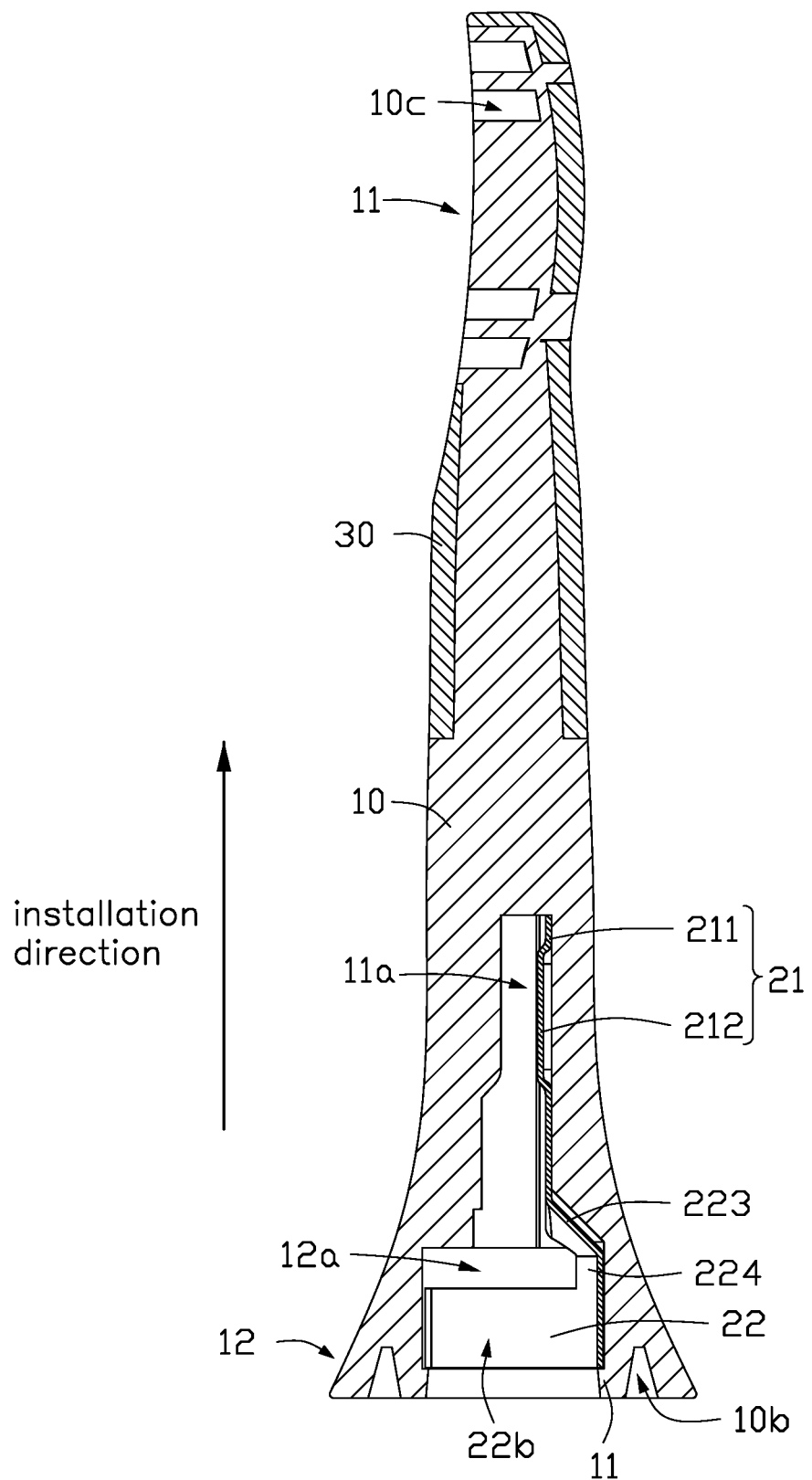
FIG. 5 is a cross-sectional view of the toothbrush head taken along V-V.

Referring to FIGS. 4 and 5, when the driving shaft exits from the holding groove 10a, the connecting body is applied a fiction force by the driving shaft. The fiction force may force the connecting member 20 to move along the driving shaft to exist the holding groove 10a. In at least one embodiment, the connecting member 20 further includes a stop part 223 configured to prevent the connecting member 20 from existing the holding groove 10a. In at least one embodiment, the connecting member 20 further includes a connecting part 224 extending away from part of the sidewall of the elastic piece 22 along the installation direction. That is, the connecting part extends away from part of the circular arc along the installation direction and is connected with the stop part 223. Two opposite surfaces of the connecting part 224 are coplanar with those of the part of the sidewall of the elastic piece. The stop part 223 extends from the connecting part 224 to connect the connecting body 21. An angle between the direction along which the stop part 223 extends and the installation direction is obtuse.

When the driving shaft exists from the holding groove 10a, the connecting body 21 is applied with a force towards the opening, and the force is transmitted to the stop part 223. Since the stop part 223 is inclined relative to the connecting body 21, the force transmitted to the stop part 223 from the connecting body 21 can be divided into a force towards the opening and a force towards the inner sidewall surrounding the lower groove 12a. Therefore, the stop part 223 is inclined arranged relative to the connecting body 21, which can not only reduce the force applied on the connecting member 20 towards the opening, but also increase the force against the inner sidewall surrounding the lower groove 12a so as to prevent the connecting member 20 from existing the holding groove 10a. Thus, the stability of the toothbrush head 100 is improved. In the present disclosure, an angle between the stop part 223 and the connecting part 224, and an angle between the stop part 223 and the connecting body 21 can be 100° ~140°. In at least one embodiment, the angle between the stop part 223 and the connecting part 224, and the angle between the stop part 223 and the connecting body 21 can be any one of 100°, 110°, 120°, 130°, 140°. In at least one embodiment, the angle between the stop part 223 and the connecting part 224, and the angle between the stop part 223 and the connecting body 21 can be 120°, which makes the connecting part 224 have a better strength and easy to process.

Referring to FIG. 3, in at least one embodiment, the stop part 223 bends along the installation direction to form a circular arc. That is, the stop part 223 is recessed along the installation direction to form an arc-shaped shape. Inner surfaces (facing away the inner sidewall surrounding the lower groove 12a) of the stop part 223, the connecting body 21, the connecting part 224, and the elastic piece 22 are continuous surfaces, and outer surfaces (facing the inner sidewall surrounding the lower groove 12a) of the stop part 223, the connecting body 21, the connecting part 224, and the elastic piece 22 are continuous surfaces. When the driving shaft exists the holding groove 10a, the stop part 223 is applied with a force towards the opening, which may force the stop part 223 to bent towards the opening. Therefore, the stop part 223 is arc-shaped, which can enhance the strength of the stop part, and prevent the stop part 223 from deforming under the force transmitted from the connecting body, thereby prolonging the service life of the toothbrush head 100.

In at least one embodiment, the connecting body 21, the elastic piece 22, the connecting part 224, and the stop part 223 are integrally formed by metal materials through punching, bending, stretching and other processes. Widths of the connecting body 21, the limit plate 223 and the connecting plate 224 are equal. In this way, the shape of the connector 20 is easier to form, further reducing the manufacturing cost of the toothbrush head 100, which is easy to form and further reduce manufacture cost.

In at least one embodiment, the connecting member 20 and the brush rod 10 are integrally formed. Specifically, after being formed by machining, the connecting member 20 is placed in a pre-designed molding mold and is integrated with the brush rod 10 through an in-mold injection molding process, so that the connection between the connecting member 20 and the brush rod 10 is more stable and does not need to be assembled together, which further reduce assemble and manufacture cost. It should be understood, the connecting member 20 and the brush rod 10 can be detachably connected. That is, the connecting member 20 and the brush rod 10 are formed respectively. The connecting member 20 can be inserted into the holding groove 10a. By reasonably setting the size of the holding groove 10a and the elastic piece 22, the elastic piece 22 resists against the inner sidewall surrounding the lower groove 12a, so as to fix the connecting body 21 in the holding groove 10a. In this way, the toothbrush head 100 is not only relatively simple in structure, but also is convenient to select an appropriate connecting member 20 according to different types of drive shafts, which greatly improves compatibility of the toothbrush head 100.

In at least one embodiment, a protruding structure 11 is formed on the inner sidewall surrounding the lower groove 12a and protrudes towards a center of the lower groove 12a, and the protruding structure 11 extends in a circumferential direction around the inner sidewall surrounding the lower groove 12a. When the driving shaft exists the holding groove 10a, the connecting body 21 together with the elastic piece 22 is forced to move towards the opening, a lower surface of the elastic piece 22 resists against an upper surface of the protruding structure 11, so as to prevent the connecting member 20 from moving out of the holding groove 10a.

Referring to FIGS. 3 and 5, in at least one embodiment, the connecting body 21 includes a clamping plate 211 and a clamping protrusion 212. The clamping plate 211 and the stop part 223 are integrally formed. The clamping protrusion 212 protrudes from a surface of the clamping plate 211 through a stretching process. The clamping protrusion 212 is substantially in a waist shape. The driving shaft defines a notch corresponding to the clamping protrusion 212. When the driving shaft is inserted into the holding groove 10a, the driving shaft resists against the clamping plate and the clamping protrusion is received in the notch, thereby fixing the driving shaft and the clamping plate 211 together. Through the clamping protrusion and the notch, the driving shaft and the toothbrush head are fixed relative to each other, which make the connection between the driving shaft and the toothbrush head more stable.

Figure 2:
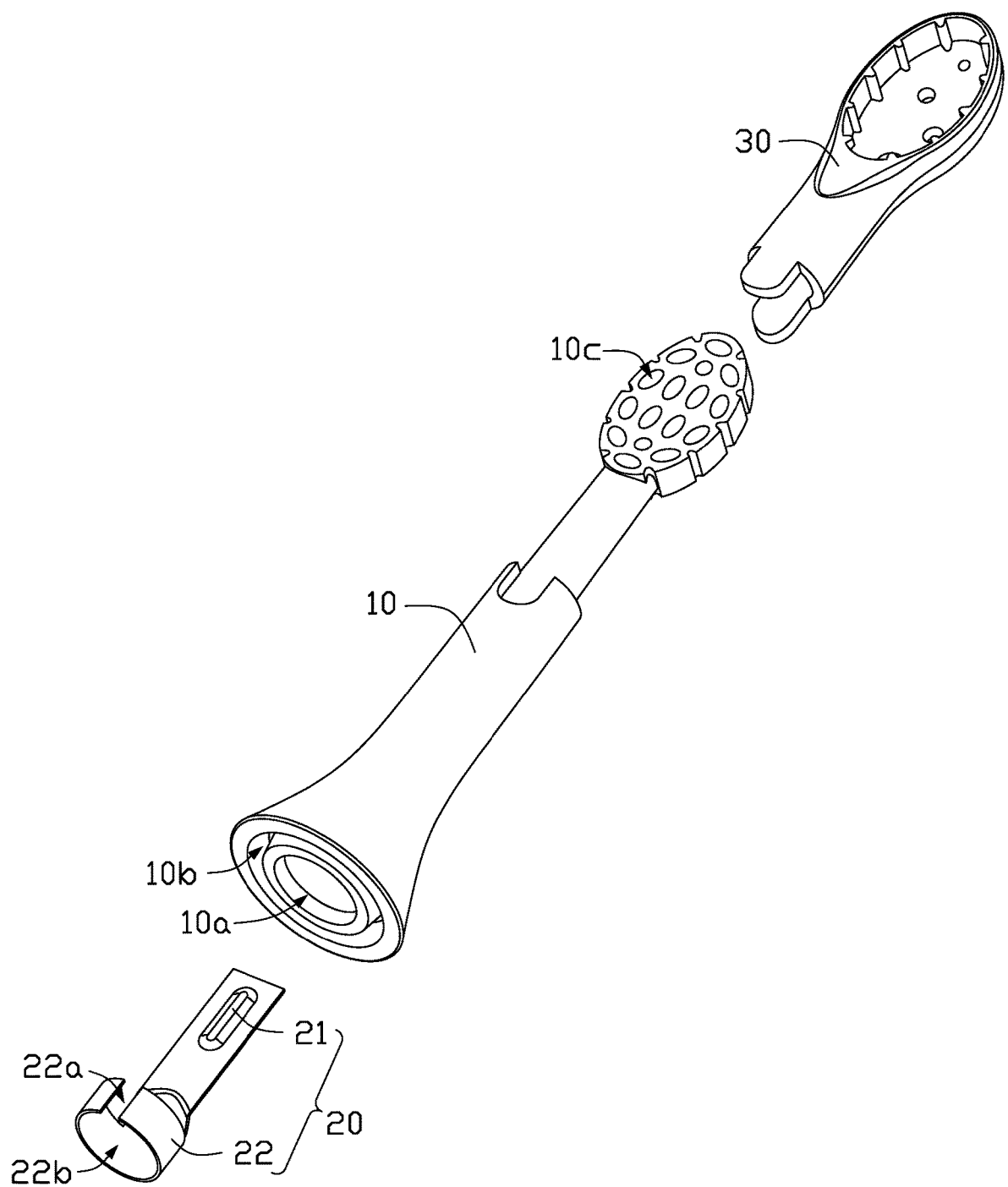
FIG. 2 is an exploded view of the toothbrush head of FIG. 1.

Referring to FIG. 2, in at least one embodiment, the toothbrush head 100 further includes a toothbrush head cap 30. The toothbrush head cap 30 is made of elastic material, such as silicone or rubber. The toothbrush head cap 30 is arranged at the first end of the toothbrush rod 10 where the brush holes 10c are arranged. In at least one embodiment, the toothbrush head cap 30 sleeves on the first end and together with the brush holes 10c fixes bristles at the first end of the brush rod 10. When in user, the end of the brush rod 10 is placed into user's mouth, the toothbrush head cap 30 made of elastic material is more comfortable. In at least one embodiment, the other end of the brush rod 10 defines a limiting slot 10b surrounding the opening. The toothbrush body is provided with a limiting protrusion corresponding to the limiting slot 10b. When the driving shaft is inserted into the holding groove 10a, the limiting protrusion is received in the limiting slot 10b, which makes the connection between the driving shaft and the toothbrush head 100 more accurate and stable.

Figure 6:
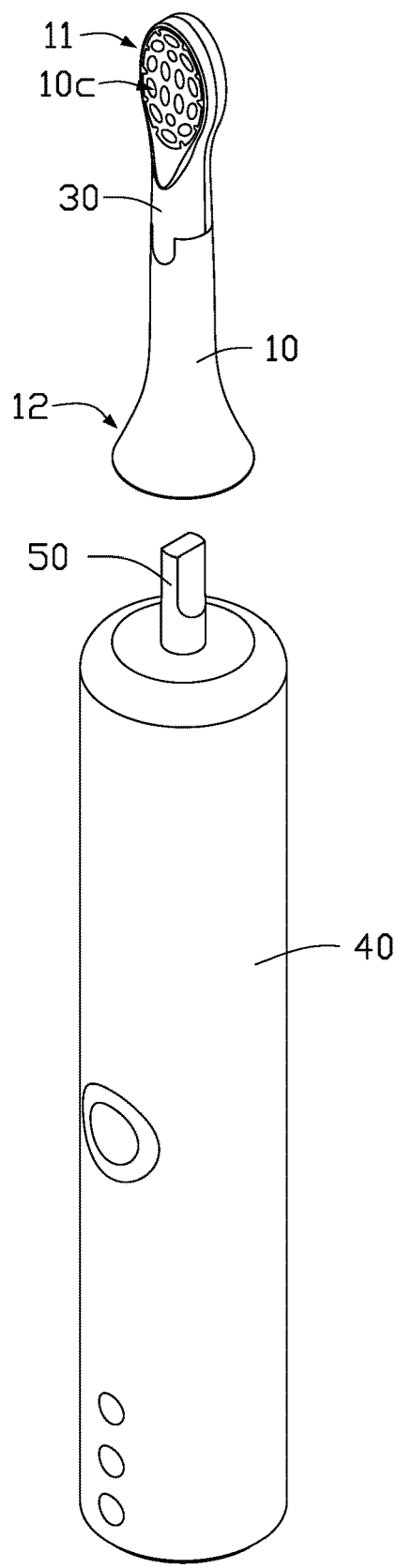
FIG. 6 is a schematic view of an electric toothbrush according to an embodiment of the present disclosure.

Referring to FIG. 6, the present disclosure further provides an electric toothbrush 1, which includes a toothbrush body 40, a driving shaft 50 and a toothbrush head. The toothbrush head can be the toothbrush head 100 illustrated in above embodiments. Accordingly, the electric toothbrush has same effects and advantages detailed in above embodiments.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A toothbrush head for an electric toothbrush, the electric toothbrush comprises a toothbrush body and a driving shaft arranged on the toothbrush body, the toothbrush head comprising:
a brush rod, wherein the brush rod has a first end configured to carry bristles and a second end configured to be connected with the driving shaft, the second end defines a holding groove, and a lower surface of the second end away from the first end is provided with an opening communicated with the holding groove; and
a connecting member, wherein the connecting member comprises a connecting body and an elastic piece connected to the connecting body, the connecting body is arranged inside the holding groove, the elastic piece is arranged between the opening and the connecting body and resists against an inner sidewall surrounding the holding groove to prevent the elastic piece from moving out of the holding groove, the opening and the holding groove are configured to allow the driving shaft to be inserted therethrough to be engaged with the connecting body.

2. The toothbrush head according to claim 1, wherein the connecting member is detachably arranged inside the holding groove.

3. The toothbrush head according to claim 1, wherein the elastic piece extends in a circular arc shape to define a limit hole, the limit hole is configured to allow the driving shaft to pass therethrough to be engaged with the connecting body, an outer diameter of the circular arc shape is greater than an inner diameter of the holding groove.

4. The toothbrush head according to claim 3, wherein the holding groove comprises an upper groove and a lower groove communicated with the upper groove and the opening, the connecting body is arranged inside the upper groove and the elastic piece is arranged inside the lower groove and resists against an inner sidewall surrounding the lower groove, a diameter of the limit hole is $D1$, a diameter of the upper groove is $D2$, a diameter of the lower groove is $D3$, $D3>D1>D2$.

5. The toothbrush head according to claim 4, wherein a direction from the second end to the first end is an installation direction, projections of the upper groove, the limit hole, and the lower groove on a plane perpendicular to the installation direction form centric circles.

6. The toothbrush head according to claim 1, wherein the elastic piece is provided with an adjusting gap running through at least part of a sidewall thereof, and the adjusting gap is configured to adjust a force of the elastic piece against the inner sidewall surrounding the lower groove.

7. The toothbrush head according to claim 6, wherein the adjusting gap together with the connecting body divides the elastic piece into a first elastic section and a second elastic section, lengths of the first elastic section and the second elastic section are the same.

8. The toothbrush head according to claim 1, wherein a direction from the second end to the first end is an installation direction, the connecting member further comprises a connecting part extends from a part of the elastic piece in the installation direction, and a stop part connected between the connecting part and the connecting body, an angle between the connecting body and the stop part and an angle between the stop part and the connecting part are obtuse.

9. The toothbrush head according to claim 8, wherein the stop part is recessed in the installation direction to form an arc shape.

10. The toothbrush head according to claim 8, wherein the connecting body, the stop part, and the connecting part have same widths.

11. The toothbrush head according to claim 8, wherein an angle between the stop part and the connecting part, and an angle between the stop part and the connecting body is 100° ~140°.

12. The toothbrush head according to claim 1, wherein the connecting body comprises a clamping plate extends in a first direction parallel to an axis of the holding groove and a clamping protrusion protrudes in a second direction perpendicular to the first direction from the clamping plate.

13. The toothbrush head according to claim 1, wherein the connecting member is integrally formed from metal materials.

14. The toothbrush head according to claim 1, wherein the toothbrush rod further comprises a protruding structure protrudes from an inner sidewall surrounding the holding groove, the protruding structure resists against a lower surface of the elastic piece to prevent the elastic piece from moving out of the holding groove.

15. The toothbrush head according to claim 1, further comprising a toothbrush head cap, wherein the toothbrush rod defines a plurality of spaced brush holes configured to fix bristles, the toothbrush head cap is configured to sleeve on the first end of the toothbrush head to help the brush holes to fix the bristles.

* * * * *